UNITED STATES PATENT OFFICE.

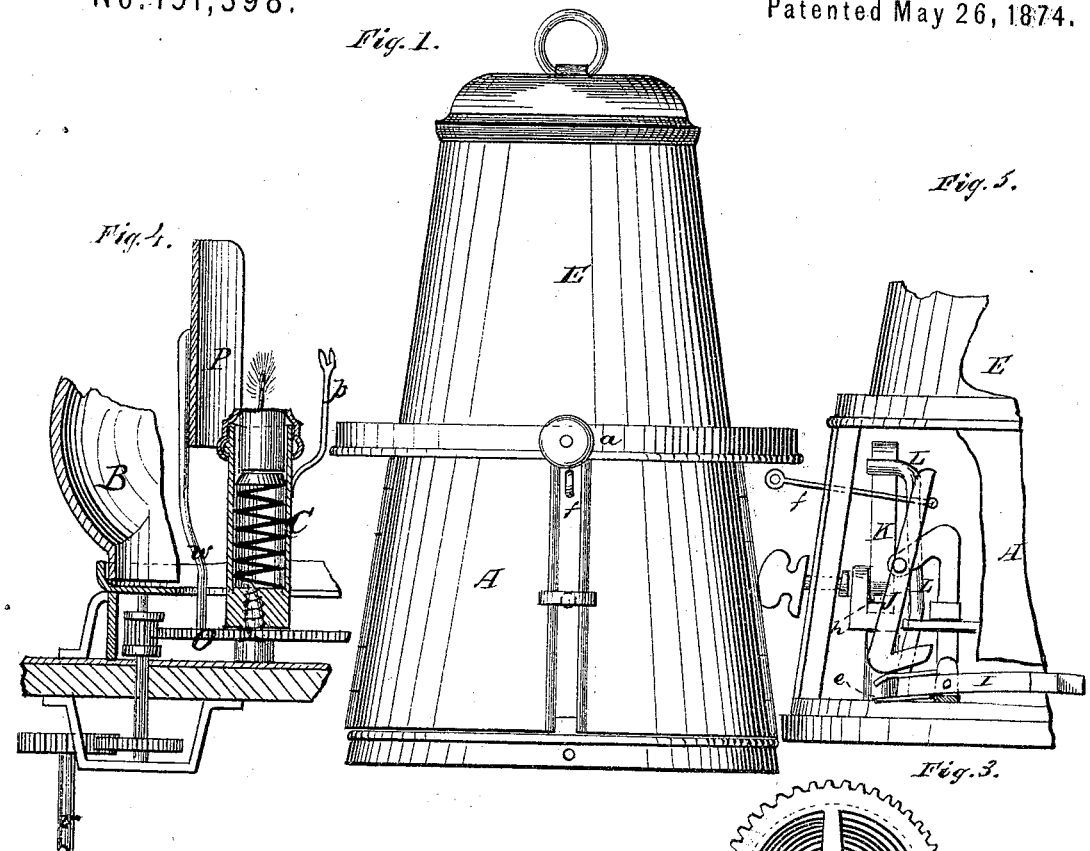
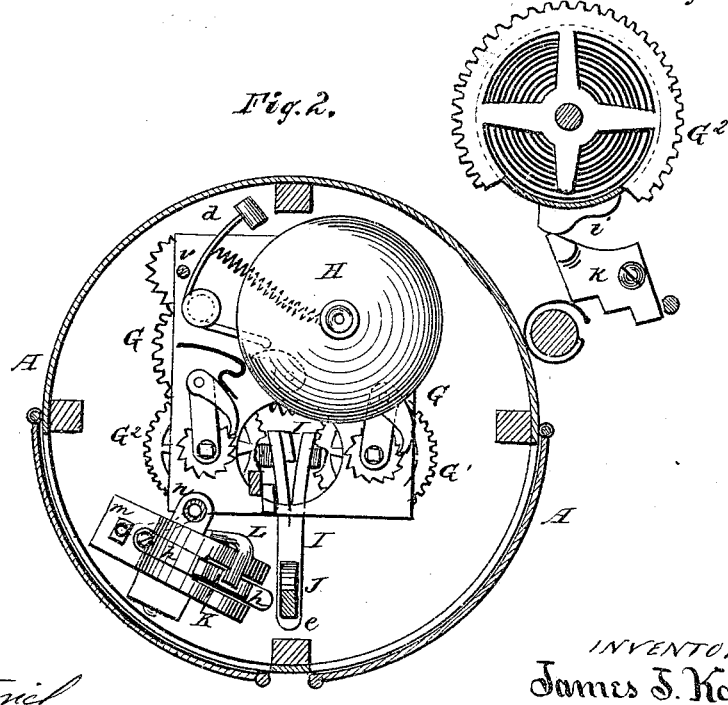

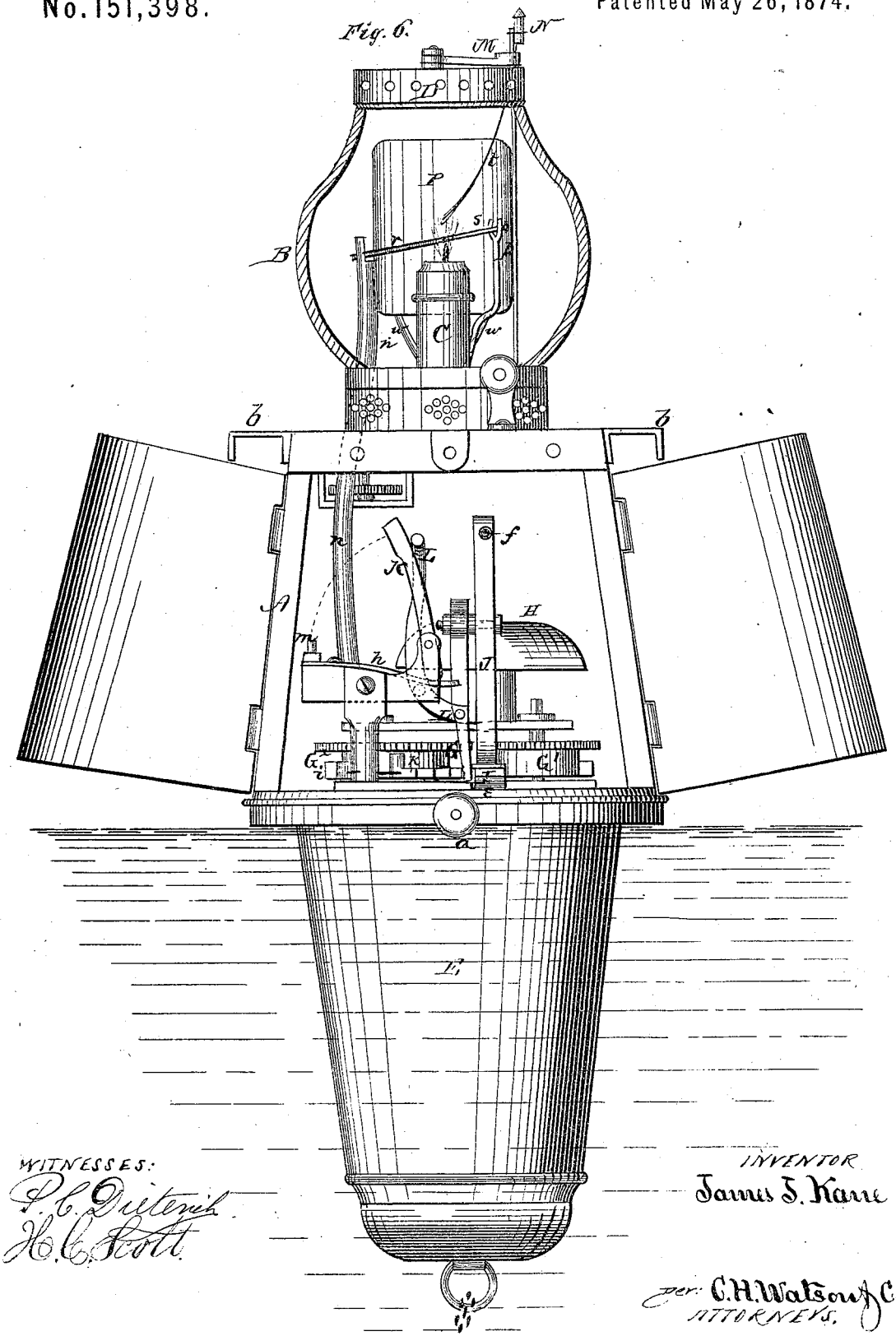
J. J. KANE.
Signals and Buoys.
No. 151,398. Patented May 26, 1874.

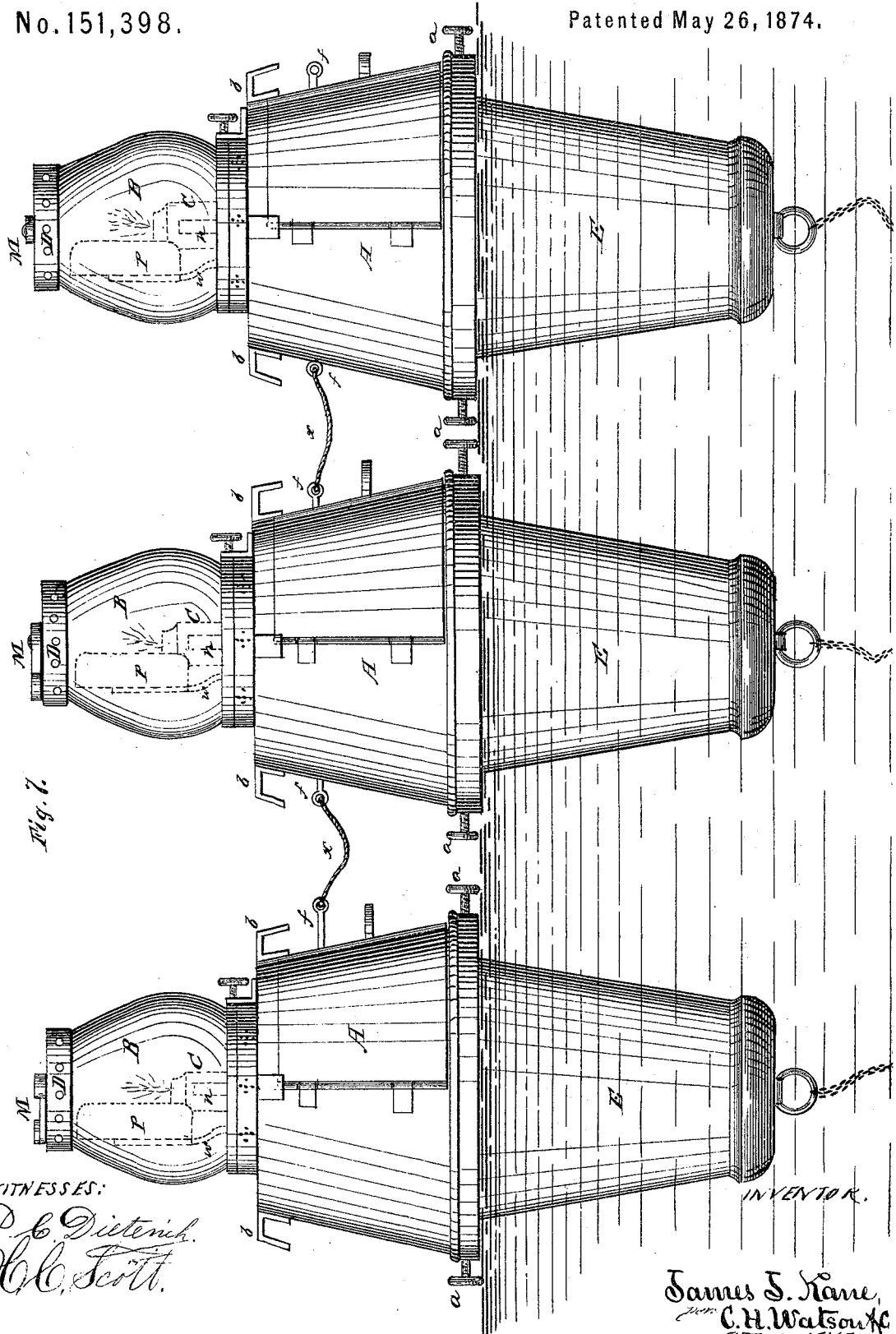

JAMES J. KANE, OF BROOKLYN, NEW YORK.

IMPROVEMENT IN SIGNALS AND BUOYS.

Specification forming part of Letters Patent No. 151,398, dated May 26, 1874; application filed May 15, 1874.

*To all whom it may concern:*

Be it known that I, JAMES J. KANE, of Brooklyn, in the county of Kings and State of New York, have invented certain new and useful Improvements in Buoy-Alarms; and I do hereby declare that the following is a full, clear, and exact description thereof, which will enable others skilled in the art to which it pertains to make and use the same, reference being had to the accompanying drawings and to the letters of reference marked thereon, which form a part of this specification:

The nature of my invention consists in the construction and arrangement of an apparatus to be attached to a floating buoy at the entrances to harbors, &c., whereby, when a vessel attempts to enter and pass said buoy an alarm will be sounded, a sky-rocket sent up, a signal-light lighted, and a reflector caused to revolve around said light, all as hereinafter more fully set forth.

In the accompanying drawings, Figure 1 is a side elevation of my apparatus as it appears when put away for storage. Figs. 2, 3, 4, and 5 are detailed views of the working parts thereof. Fig. 6 is a side view of the apparatus as it appears when in use, but with the doors of the case open to show the interior parts; and Fig. 7 represents the manner of using the apparatus.

A represents the case, which contains the working parts of my apparatus. This case is made in circular conical form, and on the top thereof, in a suitable rim or collar, is held a lantern-globe, B, in the center of which is a candle-tube, C, or its equivalent. The globe B is covered by a perforated top, D, of any suitable construction. Over the lantern is placed a cap, E, made in conical form and fastened by set-screws $a\ a$ to arms $b\ b$ projecting from the upper end of the case A. The cap E has a projecting L-shaped rim around its lower end, as shown, the interior circumference of which is about the same as the circumference of the lower end of the case. When the cap E covers the lantern my device is in the proper condition for storage or shipment. When the device, however, is to be used the cap is taken off and inverted. The case A is then placed within the rim of the cap and fastened by the set-screws $a$. The cap then forms the buoy for floating the apparatus in the water, or it may be attached to any other buoy, if desired. Within the case A is a clock-work, G, of any suitable construction, to operate one or more hammers, $d$, in a gong, H. I is the detent of the clock-work, which is is held by a spring, $e$, so as to engage therewith and prevent the alarm from sounding. This detent is to be released by the turning of a pivoted lever, J, from which a wire, $f$, passes out through the casing A. The clock-work G has two springs and spring-drums, $G^1\ G^2$, one of which operates the alarm, as above mentioned, and both are held by the detent I. The other spring and spring-drum operate the following devices: K represents a hammer, held in an upright or other position by means of a spring, $h$. On the spring-drum $G^2$ is a projection, $i$, which, as said drum revolves, turns a spring-dog, $k$, and this dog operates upon a lever, L, which in turn bears upon the hammer K and forces the same off from the point at which it is held by the spring $h$, so that said spring will throw the hammer forcibly down upon a nipple, $m$, to explode a cap placed thereon. The nipple $m$ communicates with a tube, $n$, filled with powder, which tube extends up through the top of the casing A within the globe B and to about the same height as the candle-tube C. Upon the upper end of the tube $n$, and in a forked arm, $p$, attached to the candle-tube, are supported a fuse, $r$, and match $s$, which are tied together and are in contact with the wick of the candle in the tube C. Now, as soon as the cap on the nipple $m$ is exploded the fire is communicated, through the powder in the tube $n$, to the fuse $r$ and match $s$, igniting the same and thereby lighting the candle. In a jointed arm, M, upon the lantern-top D, is held a sky-rocket, N, the fuse $t$ of which passes down through one of the perforations in the top D and above the candle-tube C, so that as soon as the signal is lighted the fuse will be ignited and the rocket sent up. Connected to and rotated by the clock-work G is an upright shaft, $v$, which, through suitable intermediate gearing, as shown in Fig. 4, rotates a cogged disk or wheel, O, placed around the lower end of the candle-tube C, immediately above the top of the case A. From this disk or wheel extend two arms, w w, which support a concave reflector, P. This reflector commences to revolve, as soon as the signal is lighted, around the light, and thus throws the light in all directions.

This device is to be used substantially in the following manner: Two or more of them are to be anchored as buoys at any desired distances apart—for instance, one on each side of a channel—and their wires f connected by a cord or wire, f', as shown in Fig. 7. Any vessel attempting to cross between them will, of course, run against the cord or wire f, breaking the same, but the force, before breaking, is such as to turn the levers J, thereby releasing the detents I, and almost in an instant two gong-bells are sounding, two lights lighted, and two sky-rockets sent up, and the reflectors commence to revolve, so as to reveal the cause of the alarm.

Having thus fully described my invention, what I claim as new, and desire to secure by Letters Patent, is—

1. The cap E, provided with a flange, adapted for combination with the case A, so as to serve as a cover in transporting the device and as a buoy and support for the case A when in use, as set forth.

2. The combination, with a floating buoy, of a clock-work for sounding an alarm, a device connected with and operated by said clock-work for lighting a signal, and an automatically-revolving reflector, substantially as and for the purposes herein set forth.

3. The combination, with a floating buoy, of a clock-work for lighting a signal and revolving a reflector, as herein set forth.

4. The combination, with a floating buoy, of a clock-work and other devices for sounding an alarm, lighting a signal, holding and letting off a rocket, and rotating a reflector, substantially as herein set forth.

In testimony that I claim the foregoing as my own, I affix my signature in presence of two witnesses.

JAS. J. KANE.

Witnesses:
THEO. N. MELVIN,
THOS. CONWELL.